United States Patent [19]

Andrew et al.

[11] Patent Number: 5,843,271

[45] Date of Patent: Dec. 1, 1998

[54] PLASTIC PIPE BUTT FUSION MACHINE AND CART ASSEMBLY

[75] Inventors: Bill Dean Andrew; Richard Leroy Goswick; Paul Michael Hatch, all of Tulsa; William Joseph Tefet, Claremore, all of Okla.

[73] Assignee: TDW Delaware, Inc., Wilmington, Del.

[21] Appl. No.: 795,101

[22] Filed: Feb. 6, 1997

[51] Int. Cl.⁶ .................................................. B32B 31/00
[52] U.S. Cl. ................... 156/499; 156/304.2; 156/304.6; 156/503; 156/579; 269/90; 269/188; 269/196; 269/203
[58] Field of Search .............................. 156/304.2, 304.6, 156/499, 503, 579; 269/89, 90, 188, 196, 198, 199, 200, 203

[56] References Cited

U.S. PATENT DOCUMENTS

| | | | |
|---|---|---|---|
| 3,391,045 | 7/1968 | Mojonnier et al. | 156/304.2 |
| 3,552,265 | 1/1971 | Lucas | 409/145 |
| 3,729,360 | 4/1973 | McElroy | 156/499 |
| 4,352,708 | 10/1982 | McElroy | 156/378 |
| 4,743,332 | 5/1988 | Black | 156/359 |
| 4,893,393 | 1/1990 | Marshall | 29/237 |
| 4,990,209 | 2/1991 | Rakes | 156/351 |
| 5,464,496 | 11/1995 | Wilson et al. | 156/499 |

*Primary Examiner*—David A. Simmons
*Assistant Examiner*—Paul M. Rivard
*Attorney, Agent, or Firm*—Head, Johnson & Kachigian

[57] ABSTRACT

An assembly is provided for butt fusing lengths of plastic pipe in axial relationship. The assembly includes a cart having a chassis and wheels, the chassis having a longitudinal axis defined by the direction of movement of the cart in a straight line. A butt fusion machine having a frame, a first clamp and a second clamp thereon, is removably positioned on the cart. Each clamp is adapted to releasably secure the end portion of a length of thermoplastic pipe so that thereby the frame has a plane of orientation along which lengths of pipe extend when secured by the clamps. An actuator is manually used to move the moveable clamp towards and away from the fixed clamp, the fusion machine being selectably mountable upon the cart chassis so that in one operating position the machine butt fuses lengths of pipe held in axial relationship, the axii of the pipe being substantially coincident with the axis of the cart and, in another position, the butt fusion machine is positioned so that the axii of the lengths of pipe being joined are perpendicular to the cart axis permitting the butt fusion machine to be mounted on the cart in the mode that most readily accommodates the working conditions wherein thermoplastic pipe is being butt welded.

10 Claims, 6 Drawing Sheets

PLASTIC PIPE BUTT FUSION MACHINE AND CART ASSEMBLY

SUMMARY OF THE INVENTION

Much of the pipeline systems being installed in the world today, particularly of 12" diameter or less, employ thermoplastic pipes.

One reason for the increased popularity of thermoplastic pipe for forming pipeline systems is the convenience of which lengths of pipe can be joined. Thermoplastic pipe is joined in end-to-end relationship by means of a machine having clamps that hold the end portions of two adjacent lengths of pipe. Such machines are referred to in the trade as "butt fusion" machines. Such butt fusion machines typically have a first and a second clamp, usually one of the clamps is fixed to the machine frame and the other clamp is moveable towards and away from the fixed clamp. In some instances, instead of a single fixed clamp and a single moveable clamp the machine has two spaced apart fixed clamps and two spaced apart moveable clamps to more securely support lengths of the pipe. Whether single fixed and single moveable clamps or double fixed and double moveable clamps are employed does not change the basic structure of the butt fusion machine. A common expedient is to move a butt fusion machine on a cart or similar wheeled conveyance, such as illustrated in U.S. Pat. Nos. 3,552,265 and 4,990,209. These machines typically have a butt fusion machine permanently mounted on a wheeled vehicle. When the butt fusion machine is designed for fusing smaller diameter pipe, such as 4" and below, the wheeled vehicle is usually manually pulled by a tongue from one location to another. One problem with wheeled vehicles (or carts as they are frequently known) is that the working conditions that exist where a pipeline system is being installed frequently make it inconvenient to always have the cart positioned in alignment with the pipeline.

The assembly for butt fusing lengths of plastic pipe of this disclosure includes a cart having a chassis, wheels and a longitudinal axis defining the direction of movement of the cart in a straight line. A butt fusion machine having a frame is removably supported on the cart. The butt fusion machine has a first clamp and a second clamp, at least one of the clamps being moveable towards and away from each other. Each clamp is to releasably secure the end portion of a length of thermoplastic pipe.

The frame of the butt fusion machine has a vertical plane of orientation within which lengths of plastic pipe extend when secured by the clamps.

Further the frame includes an actuator for moving one of the clamps toward and away from the other. The butt fusion machine frame is, according to this invention, selectably mounted on the cart chassis in four positions. In two positions the machine frame vertical plane of orientation is coincident with the cart longitudinal axis and in two other positions the frame axis of orientation is perpendicular to the cart longitudinal axis. By being able to conveniently reorient the frame of the butt fusion machine with respect to the cart, the operator, when using the assembly in the field, can orient the frame relative to the cart as is most convenient for the particular circumstances where the pipe is being joined.

The butt fusion machine as described known preferably includes a first and a second pivotal operating linkage for moving the moveable clamp, the first operating linkage being supported adjacent one side of the frame and the second operating linkage being supported adjacent the other side of the frame. An elongated handle is removably attachable to either of the first or second operating linkages so that an operator may conveniently employ the butt fusion machine while standing on either side of the frame.

In another preferred arrangement, the butt fusion machine frame has an elongated generally vertical reaction handle that has a lower end. A first opening for receiving and vertically supporting the reaction handle is positioned on one side of the frame and, a second opening for receiving and vertically supporting the reaction handle is positioned on the other side of the frame. The reaction handle may be conveniently inserted into either of the first or second openings to thereby allow the operator to place the reaction handle on the side of the frame that is most convenient for him to stand for fusing lengths of plastic pipe, according to the working conditions.

When the ends of two adjacent lengths of pipe have been heated to fusion temperature and the heater removed from between the pipe ends, the operator then moves a handle to force the molten ends of the two lengths of pipe into contact with each other. The plastic pipes must be held in this fusion position long enough for the molten ends to cool to thereby weld one length of pipe to the other. During this time the operator is prevented from undertaking any other work, that is, the operator must stand by the butt fusion machine and manually apply pressure on the handle for a sufficient length of time to allow the molten end portions of abutted lengths of plastic pipe to cool. This invention provides a means whereby the operator, after he has moved the molten ends of plastic pipe into contact with each other, can release the operating handle and allow the ends of the pipes to cool to attain fusion while, at the same time, the operator is free to do other chores. This advantage is accomplished by the employment of a pivoted locking cam. A locking cam is pivotally attached to the operating linkage. The locking cam has a friction surface thereon. Secured to the butt fusion machine frame is a ramp surface that is engageable by the locking cam friction surface. A spring mechanism biases the locking cam friction surface in the direction towards the ramp surface so that when the operator moves the clamps towards each other the locking cam friction surface engages the ramp surface to thereby hold the clamps in relationship to each other even if the operator removes force on the operating handle. This permits the operator to do other things while waiting the pipe ends to cool below fusion temperature.

In a preferred arrangement there is an operating linkage on both sides of the machine, each having a locking cam and a ramp surface supported by the frame on both sides of the machine so that there are two locking cams, each having a friction surface, each of which engages a ramp. This arrangement distributes forces within the machine more equally and reduces the possibility that a friction surface could slide upon a ramp surface to permit pipes being joined to separate before fusion occurs. The locking cams are interlocked by a shaft. The shaft is connected, at each end, to a locking cam in a way that permit limited rotational positioning of each of the locking cams relative to the shaft so that each of the locking cams, which are pulled into contact with a ramp surface by a spring, to more securely engage and lock onto a ramp surface, however, the interconnection of the locking cams by a shaft permits both locking cams to be simultaneously released from engagement with the ramp surface when the operator wishes to move the clamps apart.

A better understanding of this invention will be obtained from the following description of the preferred embodiments and the claims, taken in conjunction with the attached drawings.

BACKGROUND OF THE INVENTION

Plastic pipe is commonly used today in gas and water piping systems as well as other industrial applications. For many applications thermoplastic pipe is superior to metal pipe since plastic pipe does not rust, corrode nor is it subject to electrolysis when buried in the ground. When buried under ground plastic pipe has a long, useful life expectancy.

Another advantage of the use of thermoplastic pipe is that it can be easily joined end-to-end by heat fusion. This is termed in the industry as "butt fusion". This technique involves positioning the end portions of two adjacent lengths of pipe in axial arrangement so that the ends are close to each other but spaced slightly apart. The ends are first faced, that is, they are scraped or shaved so that the ends form, as near as possible, planes that are perpendicular to the pipe longitudinal axis.

After the ends of adjacent lengths of pipe are faced, the ends are simultaneously heated to melting temperature. When the ends have reached melted temperature the heating element used for heating purposes is removed. While the ends of the plastic pipes are molten or semi-molten, the pipes are forced axially together allowing the molten ends to contact each other. The pipes are held in contact until the temperature of the ends fall below the melting temperature, at which time the pipes are fused to each other.

To support pipes in end-to-end relationship wherein the pipes can be faced and heated and subsequently moved into contact with each other, a butt fusion machine is employed. U.S. Pat. No. 5,464,496 entitled "Plastic Pipe Butt Fusion Machine" issued Nov.7, 1995 illustrates and describes the basic concepts of a butt fusion machine. U.S. Pat. No. 5,464,496 is incorporated herein by reference.

Butt fusion of plastic pipe usually takes place in the field, that is, where pipe is being installed or repaired, as contrasted with a factory location. For this reason it is usually necessary to provide a means for moving a butt fusion machine from one location to another on the earth's surface, particularly when the pipe is of larger diameter, such as of 2" diameter and above. It has been a practice in the industry to use a cart or wagon on which a butt fusion machine is supported. As an example of a butt fusion machine supported by a cart, reference may be had to U.S. Pat. No. 3,729,360 entitled "Portable Thermoplastic Pipe Fusion Apparatus", issued Apr. 24, 1973. The teachings of this patent are also incorporated herein by reference.

A third patent that provides background information for the present disclosure is U.S. Pat. No. 4,352,708 entitled "Defined Force Fusion Machine For Joining Plastic Pipe" issued Oct. 5, 1982.

The present invention provides an improved system for transporting and using a butt fusion machine in combination with a cart by which the machine may be moved on the earth's surface for fusing together lengths of thermoplastic pipe. The invention is particularly concerned with improved means of supporting adjacent lengths of plastic pipe in a butt fusion machine and for providing a cart and butt fusion machine assembly that is adaptable for positioning the butt fusion machine in the most convenient attitude with respect to the cart according to the working conditions.

Another objective of the invention is to provide a butt fusion machine wherein two adjacent lengths of plastic pipe can be clamped within the machine and moved towards or away from each other in an arrangement wherein the machine can be operated by an operator standing on either side of the machine.

These and other objects will become apparent from the description of the preferred embodiment of the invention taken in conjunction with the attached drawings.

DESCRIPTION OF THE DRAWINGS

FIG. 4 shows the butt fusion machine positioned on the cart to fuse adjacent lengths of pipe that extend transverse to the longitudinal axis of the cart.

DETAILED DESCRIPTION OF THE PREFERRED EMBODIMENTS

Figures 1, 2:
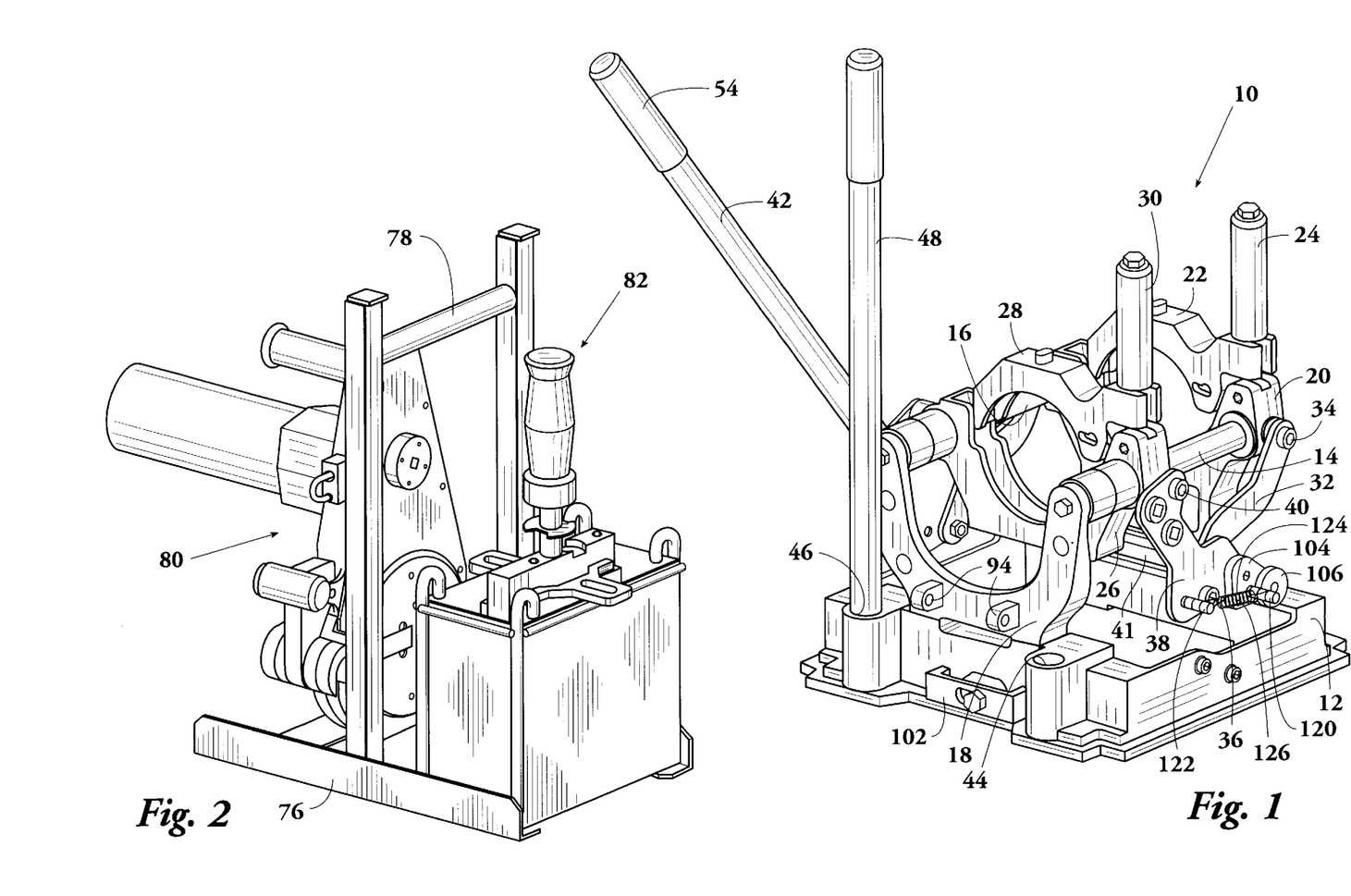
FIG. 1 is an elevational isometric view of a butt fusion machine of this invention.
FIG. 2 is a carrier for use in conjunction with a butt fusion machine. The carrier is shown having thereon a facer and a heater assembly.

Referring to the drawings and first to FIG. 1, a butt fusion machine which may also be termed a "clamping unit assembly" is indicated by the numeral 10. The function of butt fusion machine 10 is to secure the end portions of two lengths of thermoplastic pipe, such as polyethylene pipe, in end-to-end relationship, the lengths of pipes not being shown. The machine 10 includes a base 12 that supports two paralleled guide bars 14 and 16. One end of each of the guide bars is supported by a U-shaped bracket 18 extending from base 12. The other ends of guide bars 14, 16 are supported by a fixed pipe clamp 20. Clamp 20 has a pivoted upper portion 22 that can be raised to receive the end portion of a length of plastic pipe therein. The upper portion 22 is released by clamp knob 24 that is manually threaded and unthreaded to retain or release the clamp upper portion 22.

Slidably supported on guide bars 14 and 16 is a moveable clamp having a lower portion 26 and a pivoted upper portion 28. A clamp knob 30 that is manually threaded and unthreaded permits the upper portion 28 to be pivoted upwardly to receive the end portion of a length of plastic pipe therein.

The function of pipe clamps 20, 22 and 26, 28 is to retain the end portions of adjacent lengths of plastic pipe in axial alignment and to permit the end portions to be moved towards or away from each other.

A drag link 32 is secured at one end by a pivot bolt 34 to fixed pipe clamp 20. The other end of drag link 32 is attached at a pivot point 36 of an operating linkage 38. An upper end portion of operating linkage 38 is attached to the lower portion 26 of the moveable clamp by a pivot bolt 40. By rotating operating linkage 38 about pivot point 36, moveable clamp 26, 28 can be moved towards or away from fixed clamp 20, 22 to thereby move the ends of adjacent lengths of plastic pipe towards or away from each other.

Figures 9, 10:
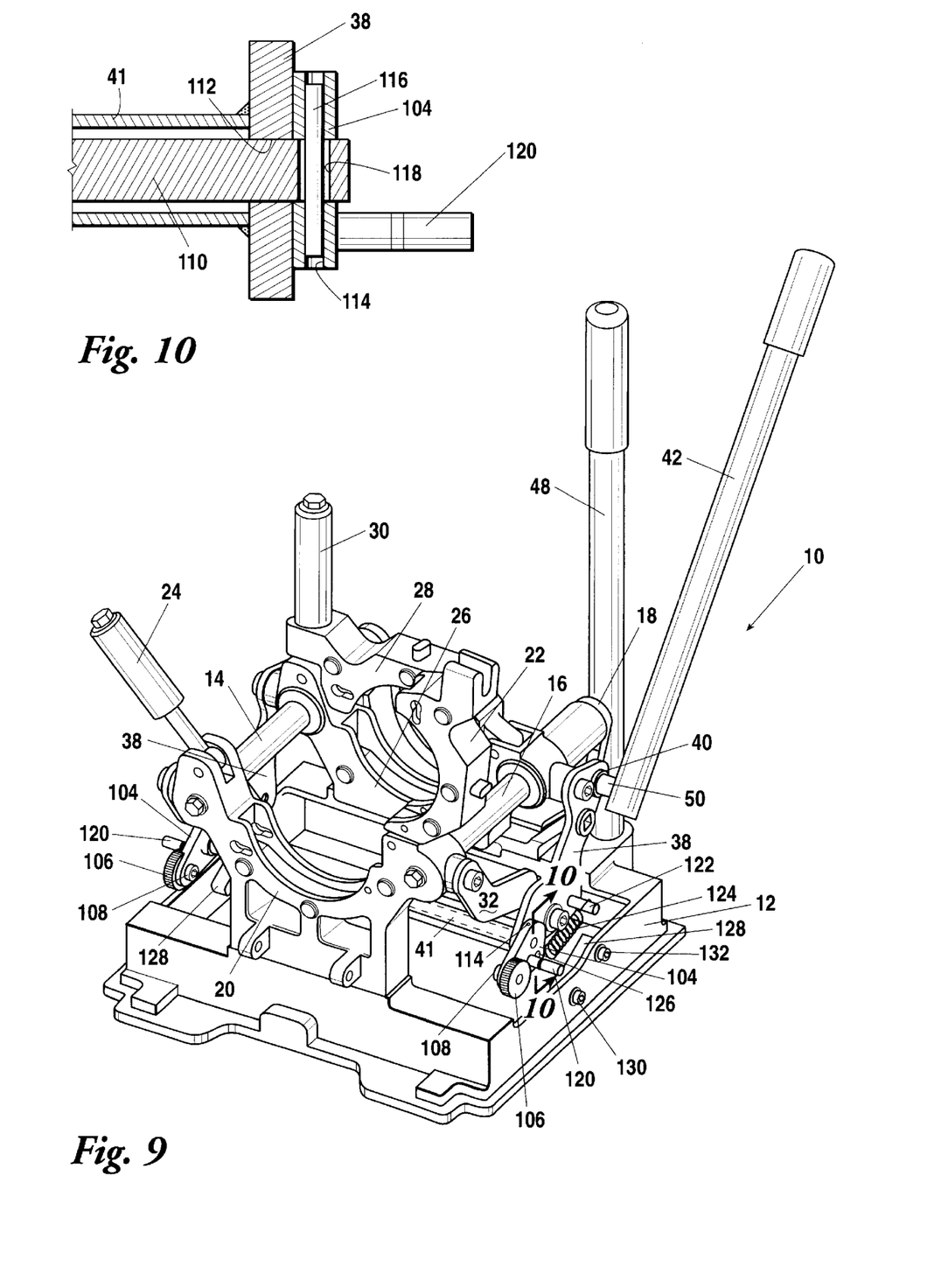
FIG. 9 is an elevational isometric view of the butt fusion machine as shown in FIG. 1, showing a view from the opposite end of the machine and illustrating in more detail the locking mechanism by which the clamps of the machine can be held in position during the fusing process.
FIG. 10 is a fragmentary cross-sectional view taken along the line 10—10 of FIG. 9 showing the relationship between an operating linkage, the locking cam and the cam shaft.

FIG. 1 clearly shows drag link 32 and operating linkage 38 on one side of the machine. The identical components are employed on the opposite side, the operating linkages 38 being connected together by a torque tube 41. As illustrated in FIG. 10, torque tube 41 is welded at each end to an operating linkage 38.

To move clamp 26, 28 towards or away from affixed clamp 20, 22, an operating handle 42 is employed. In FIG. 1 operating handle 42 is shown secured to the operating linkage that is on the side of the machine opposite to the side illustrated.

Base 12 of the butt fusion machine includes a first vertical opening 44 adjacent one side of the base and, adjacent the opposite side, a corresponding vertical opening 46. These vertical openings 44 and 46 slidably receive the lower end of a reaction handle 48 that, in FIG. 1, is shown received within and extending upwardly from vertical opening 46. The function of reaction handle 48 is to provide a hand hold for the operator when utilizing operating handle 42 to resist torque that would tend to tilt base 12 during a butt fusion operation.

Figure 8:
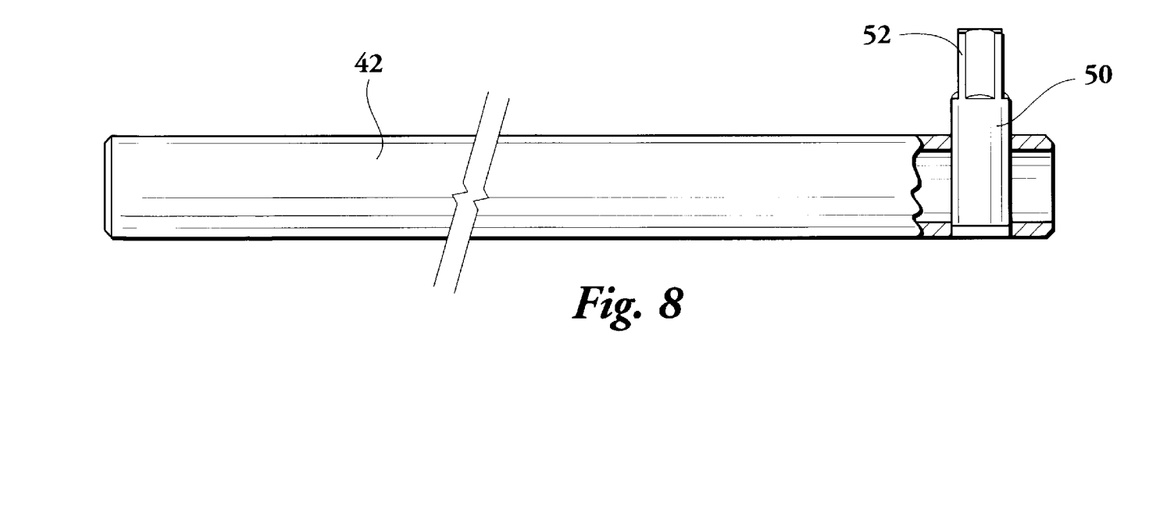
FIG. 8 is an elevational view, shown partially cut away, of the handle as used with the butt fusion machine.

FIG. 8 is a plan view, partially broken away, of operating handle 42. Affixed adjacent its lower end is an extension 50 providing, at its outer end, a non-circular end portion which is, by example, of a square cross-sectional configuration typical of the shape employed for ratchet wrenches, the square portion being indicated by the numeral 52. Handle 42 as seen in FIG. 1 has, at its upper end, an elastomeric grip 54, such as commonly employed on the ends of bicycle handles. Grip 54 of FIG. 1 is not shown on the handle in FIG. 8.

Figure 7:
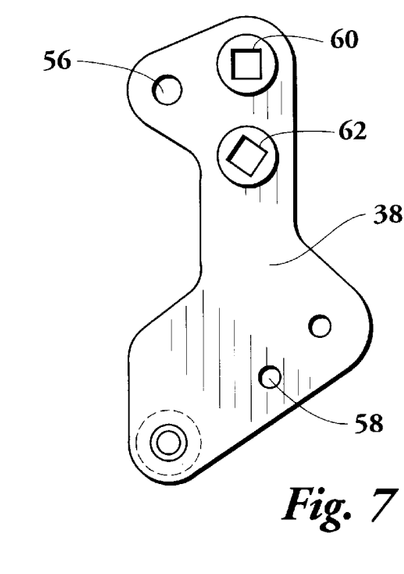
FIG. 7 is an enlarged elevational view of a linkage member used as a part of the butt fusion machine and disclosing sockets arranged to receive the drive extension of a butt fusion machine handle.

FIG. 7 shows more details of operating linkage 38, two of which are employed in the butt fusion machine. An opening 56 receives bolt 40 as seen in FIG. 1 while opening 58 receives a bolt 36 to provide a pivot point as seen in FIG. 1. Formed as a part of operating linkage 38 are two adjacent, but spaced apart sockets 60 and 62, each of which has a square opening therein dimensioned to slidably receive the square end portion 52 of operating handle 42. The orientation of the square openings in sockets 60 and 62 are displaced 45° relative to each other. By employing two separate sockets 60 and 62, one being offset 45° relative to the other, the angular position of operating handle 42, when engaged with operating linkage 38, can be selected to provide an angle of the handle that is easiest to use by an operator according to his working conditions.

Figure 3:
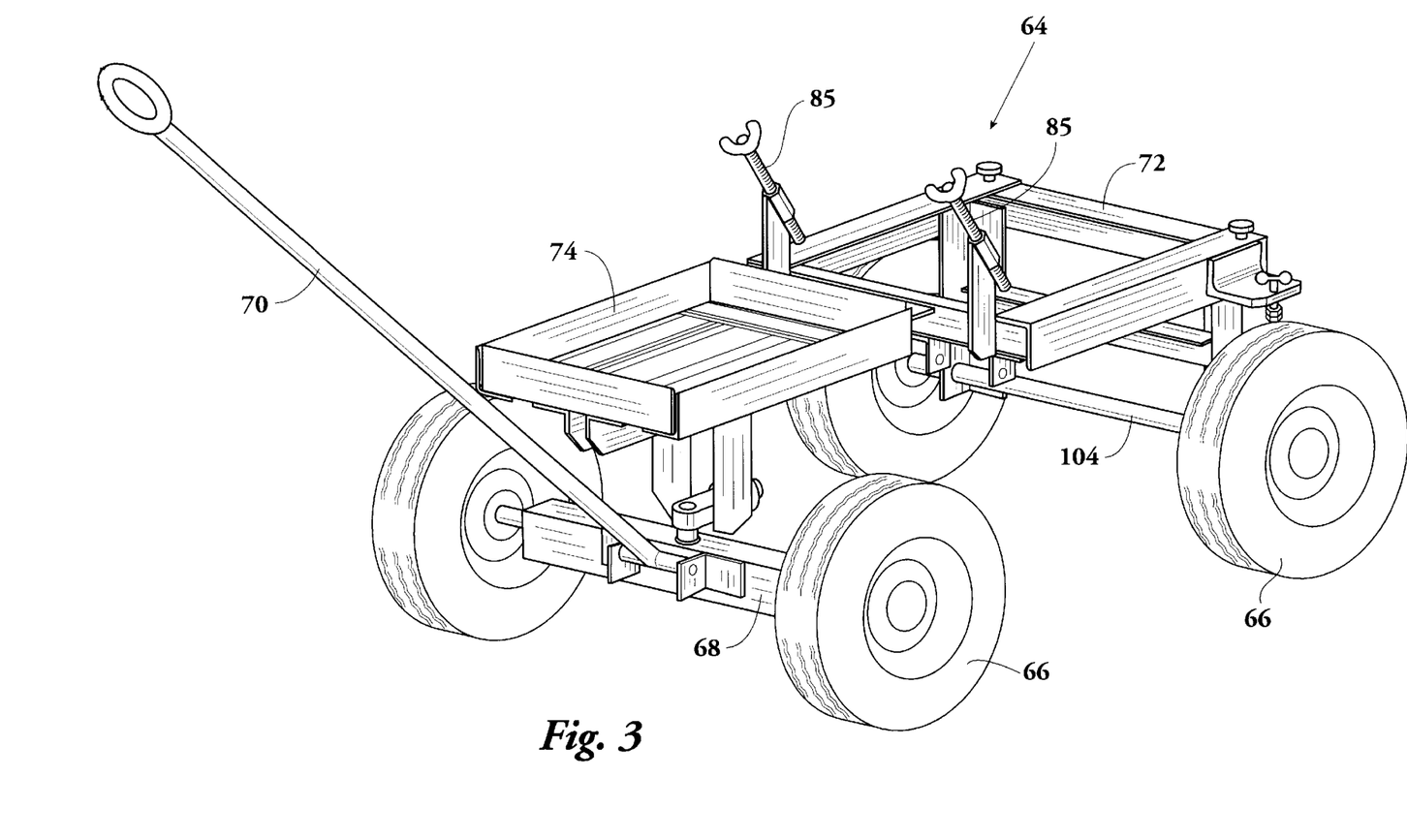
FIG. 3 is an elevational isometric view of a cart as employed in the invention, the cart having means for supporting a butt fusion machine and a facer/heater assembly carrier.

Referring now to FIG. 3, a cart which can be employed with butt fusion machine 10 is illustrated, the cart being generally indicated by the numeral 64. Cart 64 has four wheels 66. By means of a pivoted front axle 68 and a tongue 70, the cart can be pulled by an operator behind him so that the cart can be moved from place to place during the process of butt fusing adjacent lengths of plastic pipe.

The frame of cart 64 has a first portion 72 that is adapted to receive the base of a butt fusion machine such as base 12 as seen in FIG. 1. The cart has a second frame portion 74 that is configured to receive supplementary components used in the process of butt fusing pipe. Such components include a facer and a heater. FIG. 2 illustrates a carrier 76 having a handle 78. The carrier supports a facer 80 and a heater 82. Facer 80 is a machine for cleaning and shaping the ends of plastic pipe before they are fused together and is a piece of equipment well known to practitioners in the art of butt fusing thermoplastic pipe. Heater 82 is a device used for heating adjacent ends of plastic pipe to bring them to a molten state so that they can be joined while in a molten state and fused together, an item also well known to practitioners in the art. Carrier 76 is designed to make it convenient to handle these two basic components needed for pipe fusion and to fit cart frame portion 74 as was discussed with reference to FIG. 3.

Figure 4:
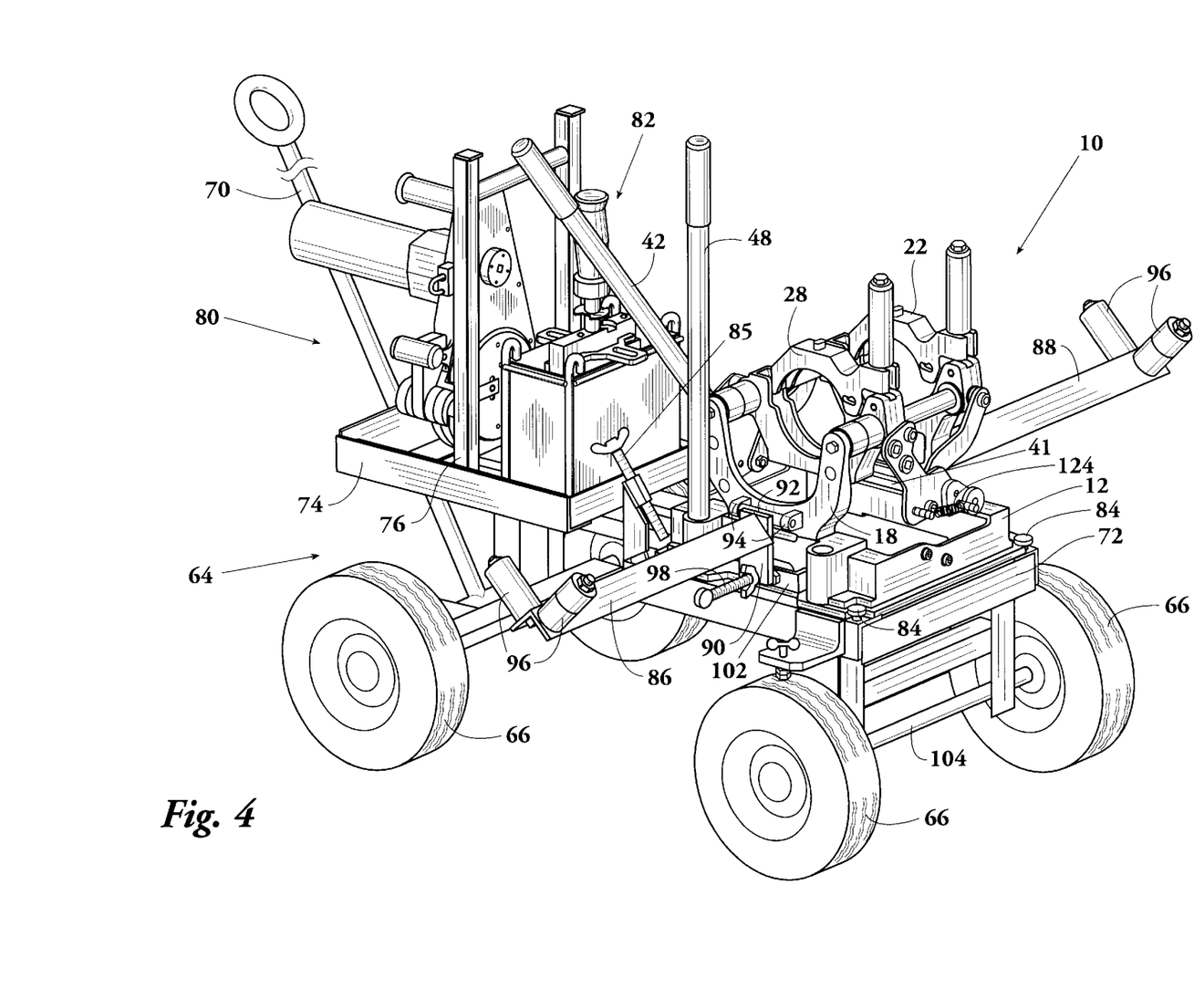
FIG. 4 is an elevational isometric view of a cart, as shown in FIG. 3, with a butt fusion machine as shown in FIG. 1 and a facer/heater assembly carrier as shown in FIG. 2 mounted thereon.

FIG. 4 illustrates a complete assembly of essentially all the mechanisms necessary for butt fusing lengths of plastic pipe for use in field operations. FIG. 4 shows cart 64 with butt fusion machine 10 positioned on it. That is, with butt fusion machine base 12 supported on cart frame portion 72. By means of bolts 84 and 85 butt fusion machine frame 12 is removably secured to cart frame portion 72. FIG. 4 also shows carrier 76 with facer 80 and heater 82 positioned on the cart frame portion 74.

FIG. 4 shows the addition of outriggers 86 and 88. The function of outriggers 86 and 88 is to provide support for adjacent lengths of plastic pipe during the process of butt fusing the ends of the plastic pipe together. In FIG. 4, outrigger 86 is shown to have an inner end plate 90 attached to a tubular portion 92 which, in turn, is pivoted between opposed bosses 94 extending from butt fusion machine bracket 18. Bosses 94 are clearly seen in FIG. 1. At the outer end of outrigger 86 are inclined rollers 96 positioned to support plastic pipe.

Figure 6:
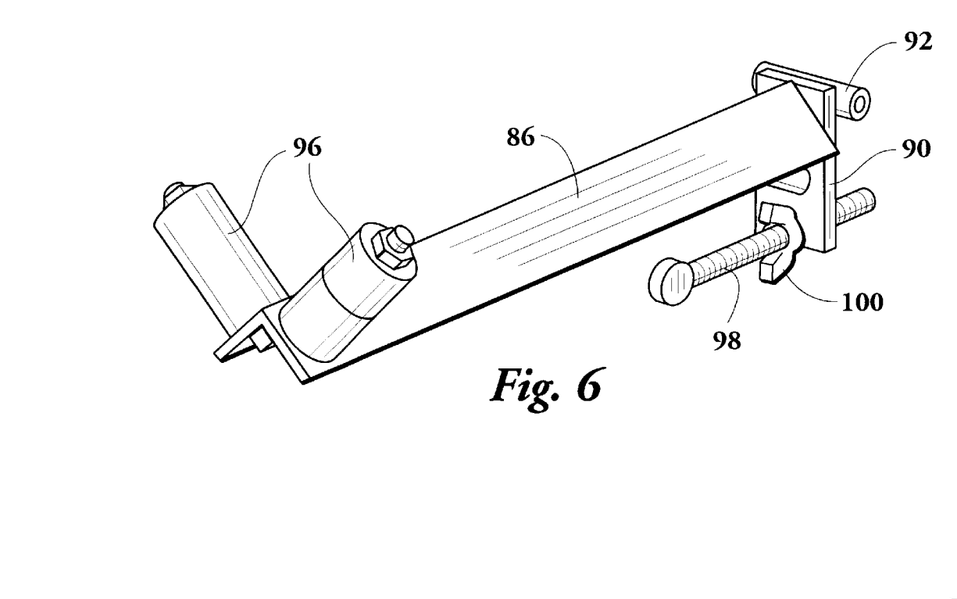
FIG. 6 is an isometric view of an outrigger of the type employed with the butt fusion machine.

FIG. 6 shows more details of outrigger 86. An angle adjustment bolt 98 extended through a threaded opening in plate 90. The position of bolt 98 can be secured by a wing nut 100. By threadably positioning bolt 98 against butt fusion machine frame 12, the angle of each of the outriggers 86 and 88 can be adjusted so that opposed lengths of pipe are held in alignment with respect to clamps 20, 22 and 26, 28.

Figure 5:
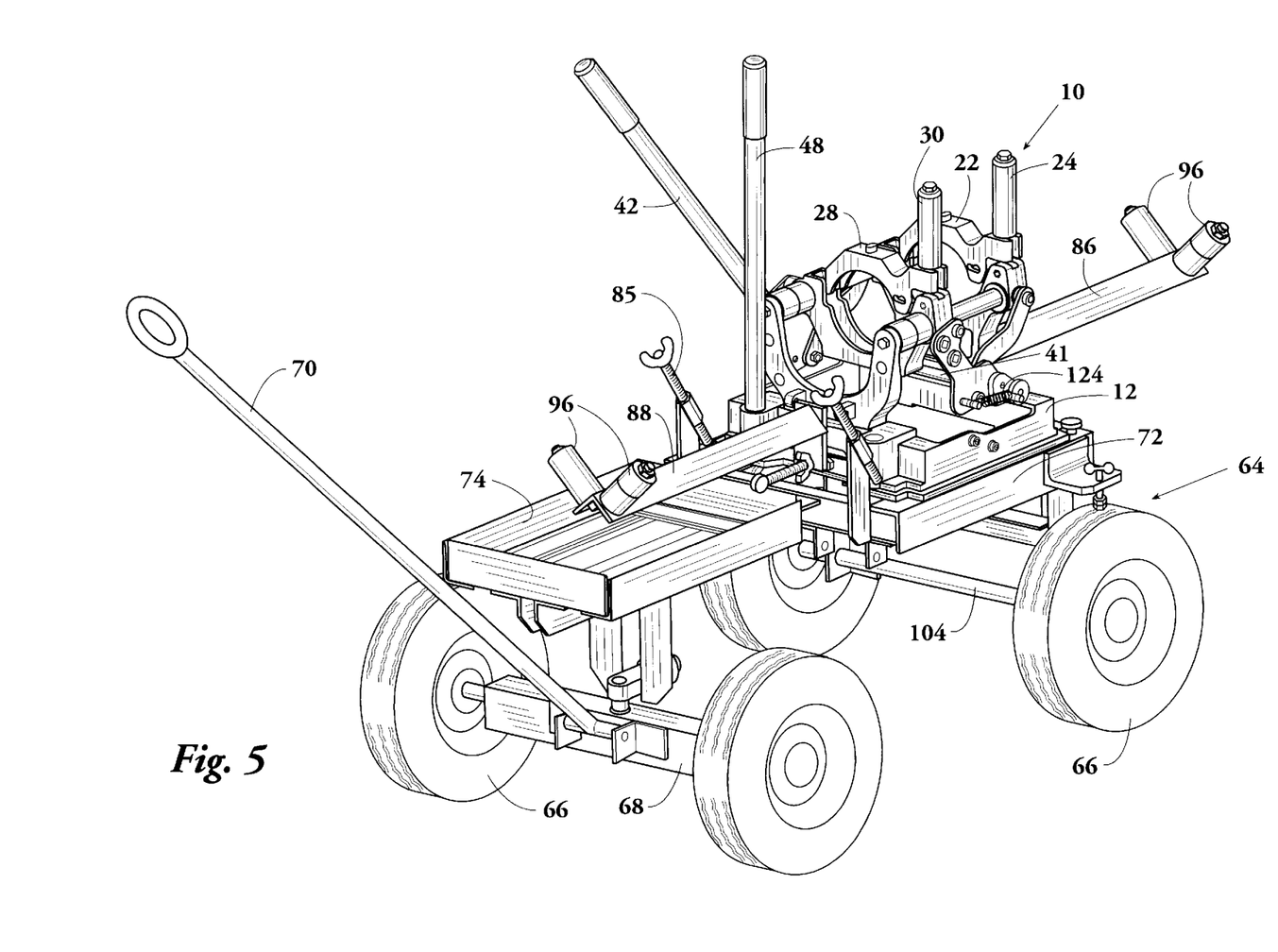
FIG. 5 is an elevational isometric view of the cart as shown in FIG. 3 having the butt fusion machine as shown in FIG. 1 positioned thereon and with the butt fusion machine including outriggers. The butt fusion machine is positioned on the cart so that lengths of plastic pipe can be fused with the tubular axii of the lengths of pipe paralleled to the longitudinal axis of the cart.

Positioned on frame 12, as seen best in FIGS. 1 and 4, is a moveable spacer 102 which angle adjustment bolt 98 can engage. Spacer 102 can be slidably positioned with respect to base 12. In one application of outriggers 86 and 88, spacer 102 is moved aside so that the inner end of each angle adjusting bolt 98 engaging the frame. When the butt fusion machine is located on the cart as seen in FIG. 5 and an operator is ready to move cart 64 to a new location to butt fuse other pipe ends, the operator may lift outrigger arms 86 and 88 by pivoting their outer ends upwardly. Spacers 102 on each side of frame 12 are then slid in position to be engaged by the inner ends of angle adjusting bolts 98. This will cause both outrigger arms 86 and 88 to extend upwardly at an angle relative to the horizontal to support the plastic pipe being assembled well above the clamping surfaces of lower clamps 20, 26. This allows the operator to pull the cart so that rollers 96 at the outer ends of the outriggers roll along the pipe. When the operator reaches a location where the next fusion operation is to be performed, the outriggers are lowered into their operating positions (as shown in FIGS. 4 and 5) by slidably moving spacers 102. This permits the inner ends of angle adjusting bolts 98 to engage frame 12 so that the outrigger arms extend generally horizontally to support pipe lengths during a fusion operation.

An important feature of this invention is the way the butt fusion machine 10 is used in conjunction with cart 64. FIG. 4 shows the butt fusion machine 10 oriented with respect to the cart frame portion 72 so that outriggers 86 and 88 extend perpendicular to the longitudinal axis of the cart. By "longitudinal axis" of the cart is meant the direction the cart travels when pulled by handle 70 with the cart front axis 68 paralleled to rear axle 104 as seen in FIGS. 3 and 5. In the arrangement of FIG. 4, lengths of pipe to be butt fused will extend perpendicular to the longitudinal axis of the cart. FIG. 5 illustrates the arrangement wherein the butt fusion machine has been reoriented 90° with respect to FIG. 4 so that, in FIG. 5 outrigger arms 86 and 88 extend in a vertical plane that is paralleled to the longitudinal axis of cart 64. When the orientation of the butt fusion machine relative to the cart is as in FIG. 5, the carrier supporting the facer and the heater is removed from the cart.

The ability to orient the butt fusion machine selectably relative to the cart permits the operator to utilize the cart/butt fusion machine combination in the manner that is most feasible according to working conditions.

As previously indicated, operating handle 42 and backup handle 48 may be shifted to opposed sides of butt fusion machine 10. All that is necessary to change the side of the butt fusion machine at which an operator must stand during a fusion procedure is that operating handle 42 be disengaged from a socket on an operating linkage 38 on one side of the machine and reinserted end 52 into a socket on the operating linkage on the opposite side of the machine. At the same time reaction handle 48 is moved from opening 46 to opening 44 or vice versa so that the operating handle and actuating arm are on the same side of the machine.

In many instances, lengths of thermoplastic pipe are butt fused to each other along a ditch in which the pipe is to be buried. When cart 64 is used along a ditch, the operator can shift the operating handle and reaction handle to the side away from the ditch so that all work of butt fusing successive lengths of plastic pipe can be carried out with the operator displaced away from the ditch in which the pipe is to be subsequentially buried. Any number of other location hazards, such as highway traffic, mounds of dirt, machinery, etc. can be avoided by the two primary unique features of this invention, that is, the ability to orient the butt fusion machine with respect to the cart longitudinal axis and, at the same time, the option of the operator to choose the side of the machine on which he wishes to work.

When two lengths of pipe have been positioned within the fixed pipe clamp and the moveable clamp, they must be moved towards each other to engage a facer, such as the type illustrated by the numeral 80, to prepare the ends of the pipes. Subsequently, they must be moved away from each other to permit the facer to be extracted from its position between clamps 20, 22 and 26, 28. Thereafter, a heater, such as heater 82, is inserted between the prepared ends of the pipes and, by use of actuating handle 42, moveable clamp 28 is moved towards fixed clamp 22, moving the pipes together to engage opposed surfaces of the heater. Thereafter the pipes are again moved apart to permit the heater to be withdrawn. The opposed ends of adjacent lengths of pipe, having been raised to molten temperature, are, while in a molten state, forced into contact with each other. The pipes are held in this closed position until the molten surfaces cool and solidify, after which upper portions 22 and 28 of the clamps are released by rotating clamp knobs 24 and 30 to remove the fused pipe from the machine. This sequence is repeated until a complete line of thermoplastic pipe has been butt fused end-to-end. Cart 64 provides a convenient means of efficiently moving the butt fusion machine and ancillary equipment along the pipeline. The adaptability of the butt fusion machine in combination with the cart facilitates and expedites sequential butt fusion of adjacent lengths of plastic pipe.

An important feature of this invention is an improved means of locking the moveable clamp with respect to the fixed clamp during a fusion operation so that when the opposed ends of lengths of thermoplastic pipe have been heated and the operator forces the ends of the pipe together by using the operator handle, the operator can release hold on the handle and do other things while the fused joint is cooling. This feature is best illustrated in FIGS. 9 and 10. FIG. 9 shows the butt fusion machine 10 as has been described with reference to FIG. 1, the machine being also illustrated in FIGS. 4 and 5. However FIG. 9, as compared to FIG. 1, shows a view from the opposite end of the machine. As has been described, a first length of pipe (not shown) is fixed in a moveable clamp having a lower jaw 26 and an upper jaw 28 and a second length of pipe (not shown) in a fixed clamp having a lower jaw 20 and an upper jaw 22. After the pipes have been faced and the ends heated to fusion temperature, the operator engages handle 42 and, by forward motion, pivots one of the operating linkages 38 to which the handle is attached, depending on the side of the machine most convenient to the operator. Drag links 32 draw moveable clamp 26, 28 towards fixed clamp 20, 22. When the molten ends of the pipes to be joined contact each other, the molten thermoplastic on the end of one pipe intermingles with the molten thermoplastic on the end of the other pipe and, if the pipes are held in the joined condition for sufficient time to allow the molten thermoplastic to cool the pipes are then axially bonded to each other with a tensile strength that normally exceeds the tensile strength of the pipe itself. Therefore it is important that the pipes be held in coaxial relationship with each other for a sufficient length of time to make certain that the entire joint has cooled to below the molten temperature so that the joint then is as rigid as the pipe. Heretofore, when using machines that have no locking mechanism, the operator was required to manually hold the pipes in end-to-end relationship by keeping pressure on handle 42. To relieve the operator of this chore, a locking mechanism is provided as illustrated in FIG. 9, that includes a locking cam on each side of the machine, that is, a cam 104 on one side of the machine and an identical cam 104 on the opposite side of the machine. Each locking cam supports, at its outer lower end, a friction nut 106. Each friction nut has a circumferential cylindrical surface that is serrated or otherwise roughened or textured. Each friction nut is non-rotatably secured to a locking cam by means of a bolt 108.

Locking cams 104 are supported at the outer ends of a cam shaft 110 that is received within torque tube 41. The cam shaft extends rotatably through an opening 112 in each operating linkage 38. A drill hole 114 extends through each locking cam 104 and each receives a pin 116. Cam shaft 110 has, in alignment with the locking cam on each end thereof, an opening 118, the opening 118 being of greater internal diameter than the external diameter of pin 116. By this arrangement, which is illustrated in FIG. 10, the locking cams 104 on the opposite ends of cam shaft 110 are rotatably secured to each other but each has a slight angular play relative to the other of about 10°.

Extending from each of the locking cams 104 is a stud member 120 and, in like manner, extending from each operating linkage 38 is another stud member 122. Stretching between stud members 120 and 122 is a spring 124, there being one spring for each of the locking cams.

Each of the locking cams is pivoted about cam shaft 110 to an operator linkage 38. Thus, springs 124, one on each side of the butt fusion machine, tend to downwardly pivot locking cams 104.

Secured to an interior surface of base 12 is a bar having a ramp surface 128, the bar being held in position by bolts 130 and 132.

The locking mechanism works in this way. When an operator moves handle 42 forwardly, pivoting operating linkage 38 to draw the moveable clamp towards the fixed clamp, that is, to draw the end portions of pipes secured within the clamps towards each other, friction nuts 106 on each side of the machine engage ramp surfaces 128. The serrated surfaces of friction nuts 106 lock onto ramp surfaces 128 so that when handle 42 is released the clamps are nevertheless held in their fixed position with respect to each other. The angular play of the locking cams with respect to each other allows each friction nut 106 to lock independently onto a ramp 128. That is, locking nuts 106 prevent operating linkage 38 from being pivotally displaced thereby holding the clamps in their fixed relationship and consequently holding pipes secured within the clamps in a fixed position, allowing time for molten thermoplastic at the ends of each of the pipe to cool below the molten temperature to accomplish fusion of the pipes. After a sufficient time has elapsed, during which the operator may be doing other chores, the locking mechanism can be released by upwardly pivoting locking cams 104. This can be accomplished by means of moving post 120 to pivot locking cams 104 in the direction to move friction nut 106 away from ramp surfaces 128.

The butt fusion machine is so arranged that locking nuts 106 do not engage ramp surfaces 128 except when the clamps are moved to cause the ends of pipe to contact each other. That is, during facing and heating operations the spacing between the ends of the lengths of the pipe are such that locking nuts 106 do not come into contact with ramp surfaces 128.

This locking feature improves efficiency of use of the butt fusion machine by freeing an operator to do other things while waiting for the temperature of the molten ends of the pipe to fall below the fusion temperature.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An assembly for butt fusing lengths of plastic pipe comprising:

a cart having a cart chassis, wheels and a longitudinal axis;

a butt fusion machine having a frame, a first clamp and a second clamp thereon, at least one of the clamps being moveable towards and away from the other, each clamp being adapted to releasably secure an end portion of a length of thermoplastic pipe, the frame having a vertical plane of orientation within which lengths of plastic pipe extend when secured by said clamps; and an actuator for moving one said clamp towards and away from the other, said fusion machine frame being selectably mountable on said cart chassis in a plurality of selectable positions wherein, in one of said positions said machine frame vertical plane of orientation is at least substantially coincident with said cart longitudinal axis and in a second position said machine frame vertical plane of orientation is at least substantially perpendicular to said cart longitudinal axis.

2. A butt fusion machine for use in fusing in end-to-end relationship lengths of thermoplastic pipe comprising:

a frame having a first end, a second end, a first side and a second side;

a first clamp secured to said frame and adapted to releasably secure a first length of plastic pipe;

a second clamp mounted on said frame and adapted to releasably secure a second length of plastic pipe in axial alignment with said first length of plastic pipe, at least one of said clamps being moveable towards and away from the other of said clamps;

a first operating linkage interconnecting said first and second clamps and pivotally supported adjacent one of said frame sides;

a second operating linkage interconnecting said first and second clamps and pivotally supported to said frame adjacent the other of said frame sides; and an elongated handle removably and selectably attachable to said first or second operating linkages whereby an operator may conveniently operate the butt fusion machine from either of said frame sides.

3. A butt fusion machine according to claim 2 including an elongated, generally vertical reaction handle having a lower end;

a first means for vertically and removably receiving said reaction handle lower end adjacent said first side of said frame; and a second means for vertically and removably receiving said reaction handle lower end adjacent said second side of said frame whereby an operator may conveniently employ said reaction handle from either side of said frame.

4. A machine for butt fusing lengths of plastic pipe comprising:

a frame having opposed first and second sides;

a first clamp supported to said frame;

a second clamp supported to said frame, at least one of first and second clamps being moveable towards and away from the other clamp, the clamps being adaptable to releasably secure end portions of lengths of thermoplastic pipe in axial alignment with each other;

a first and a second operating linkage, one adjacent each of said frame sides, each operating linkage being pivotal to move said clamps towards and away from each other;

first and second locking cams pivotally attached separately to said first and second operating linkages, each locking cam having a friction surface thereon;

first and second ramp surfaces, one for each of said locking cams, each being supported to said frame and each being engageable by a said locking cam friction surface; and first and second biasing means to separately urge said friction surfaces of said locking cams towards a said ramp surface whereby when a said operating linkage is pivoted to move said clamps towards each other said friction surface of each of said locking cams individually engage a said ramp surface to retain said clamps in proximity to each other.

5. A machine for butt fusing lengths of plastic pipe according to claim 4 wherein said first and second locking cams are rotationally interconnected by a cam shaft.

6. A machine for butt fusing lengths of plastic pipe according to claim 5 wherein said first and second locking cams are each connected to said cam shaft with a slight rotational slack with respect to each other.

7. A machine for butt fusing lengths of plastic pipe according to claim 4 including a friction nut secured to each of said locking cams and each friction nut having an external friction enhancing surface that is engageable with a said ramp surface.

8. An assembly for butt fusing lengths of plastic pipe according to claim 1 including:

a first and a second elongated outrigger each having an inner end, the inner ends beings secured to opposed sides of said butt fusion machine frame and pivotal in a vertical plane of orientation;

pipe supporting means on an outer end of each of said outriggers; and means to selectably elevationally position said outriggers with respect to said frame whereby lengths of plastic pipe can be selectably elevationally supported with respect to said frame.

9. An assembly for butt fusing lengths of plastic pipe according to claim 1 including:

a rack forming a part of said cart chassis; and a carrier removably positionable on said rack.

10. An assembly for butt fusing lengths of plastic pipe according to claim 9 wherein said carrier is configured to support at least one of a plastic pipe facer and a plastic pipe heater.

* * * * *

UNITED STATES PATENT AND TRADEMARK OFFICE
CERTIFICATE OF CORRECTION

PATENT NO. : 5,843,271
DATED : December 1, 1998
INVENTOR(S) : Andrew, et. al.

It is certified that error appears in the above-identified patent and that said Letters Patent is hereby corrected as shown below:

Title page, item [75], inventors, change William Joseph "Tefet" to -- Tefft--.

Signed and Sealed this

Ninth Day of March, 1999

Attest:

Q. TODD DICKINSON

*Attesting Officer*  *Acting Commissioner of Patents and Trademarks*